United States Patent
Karr et al.

(10) Patent No.: US 7,254,736 B2
(45) Date of Patent: Aug. 7, 2007

(54) SYSTEMS AND METHOD PROVIDING INPUT/OUTPUT FENCING IN SHARED STORAGE ENVIRONMENTS

(75) Inventors: Ronald S. Karr, Palo Alto, CA (US); John A. Colgrove, Los Altos, CA (US); Oleg Kiselev, Palo Alto, CA (US)

(73) Assignee: Veritas Operating Corporation, Cupertino, CA (US)

( * ) Notice: Subject to any disclaimer, the term of this patent is extended or adjusted under 35 U.S.C. 154(b) by 581 days.

(21) Appl. No.: 10/322,935

(22) Filed: Dec. 18, 2002

(65) Prior Publication Data

US 2004/0123053 A1    Jun. 24, 2004

(51) Int. Cl.
*G06F 1/00* (2006.01)
(52) U.S. Cl. .................. 713/500; 713/1; 713/152; 713/155; 713/201
(58) Field of Classification Search .............. 713/1, 713/152, 155, 201
See application file for complete search history.

(56) References Cited

U.S. PATENT DOCUMENTS

| | | | |
|---|---|---|---|
| 5,390,326 A * | 2/1995 | Shah ..................... 370/222 |
| 5,511,220 A * | 4/1996 | Perlman .................. 712/30 |
| 5,625,796 A | 4/1997 | Kaczmarczyk et al. |
| 5,659,688 A | 8/1997 | Nimishakavi et al. |
| 5,999,930 A | 12/1999 | Wolff |
| 6,173,293 B1 * | 1/2001 | Thekkath et al. ........... 707/201 |
| 6,192,483 B1 | 2/2001 | Moiin et al. |
| 6,226,717 B1 | 5/2001 | Reuter et al. |
| 6,345,331 B1 * | 2/2002 | Fuente ........................ 710/72 |
| 6,389,420 B1 * | 5/2002 | Vahalia et al. ................ 707/8 |
| 6,484,217 B1 * | 11/2002 | Fuente et al. ................. 710/15 |
| 6,526,489 B1 * | 2/2003 | Kikuchi et al. ............. 711/164 |
| 6,530,004 B1 | 3/2003 | King et al. |
| 6,553,511 B1 | 4/2003 | DeKoning et al. |
| 6,622,163 B1 * | 9/2003 | Tawill et al. ................ 709/211 |
| 6,658,417 B1 * | 12/2003 | Stakutis et al. ................ 707/10 |
| 6,763,402 B2 * | 7/2004 | Talati ........................ 710/36 |
| 6,862,690 B1 * | 3/2005 | Bezera et al. .................. 714/4 |
| 6,993,763 B2 * | 1/2006 | Hayes, Jr. ................... 718/102 |
| 2002/0152214 A1 * | 10/2002 | Muntz ........................ 707/10 |
| 2003/0221124 A1 * | 11/2003 | Curran et al. ................ 713/201 |

* cited by examiner

*Primary Examiner*—Chun Cao
*Assistant Examiner*—Vincent Tran
(74) *Attorney, Agent, or Firm*—Meyertons Hood Kivlin Kowert & Goetzel, P.C.; B. Noël Kivlin

(57) ABSTRACT

Systems and methods for I/O fencing in a shared storage environment are provided. Prior to initiating an I/O request, when feasible, the current time from a local timer is compared to the current state of an interval obtained for the target device. As a result, a device reset occurring while the interval is viable does not arbitrarily end a multiphase I/O operation. However, a device reset occurring once the lease has expired results in a delay or termination of the multiphase I/O operation. As a result, multiphase I/O operations from initiating hosts that have lost contact with the shared storage environment are not allowed to corrupt the shared storage devices.

38 Claims, 6 Drawing Sheets

SYSTEMS AND METHOD PROVIDING INPUT/OUTPUT FENCING IN SHARED STORAGE ENVIRONMENTS

FIELD OF THE INVENTION

The present invention is related to input/output (I/O) fencing techniques, and more particularly to systems and methods for fencing I/O in a shared storage environment using local timers and a device reset.

BACKGROUND OF THE INVENTION

Clustering is the use of multiple computers, multiple storage devices, and redundant interconnections to form what appears to users as a single, highly available system. A cluster is a shared storage environment in which a collection of these components forms the highly available system.

When a particular component of the cluster fails (e.g. ceases to operate), the functions of that component are assumed by other components within the cluster in a process called "failover". Some clusters identify component failure by maintaining regular "heartbeat" signals between cluster components. Thus, when a particular component fails to provide a heartbeat signal, the cluster may execute a recovery operation, readjusting the cluster to a configuration that does not include the failed component.

In addition to simply ceasing operation, a cluster component may merely fail to perform some task within a bounded interval. For example, a component may be stopped in a debugging state, failing while in that debugging state to provide a heartbeat signal to the cluster. As another example, a high priority process competing for CPU time can cause an unexpected scheduling delay in a lower priority process, such that the lower priority process appears non-communicative to other components in the cluster. Under these conditions, the cluster may determine that the non-communicative component has failed and, in response, execute a recovery operation.

However, when exiting the debugging state or regaining CPU processing time in the above examples, the component may again communicate with the cluster. Thus, the non-communicative component still may be able to communicate with a storage device in the cluster. For example, a sequence of events may include the step of testing a clock prior to a process performing a particular action. A delay may occur between the test of the clock and the performance of the action. When the delayed process (or non-communicative component) performs the action, this action may be destructive in a way that would not have been possible had the action been performed immediately after the test of the clock. Under these conditions, it is possible to corrupt the storage device.

Specifically, if a particular computer or storage device (i.e. an initiating host) desires to access (e.g. to write to) a particular storage device (i.e. a target device), then the initiating host establishes an interval with (e.g. obtains permission from) the cluster to perform that write operation. Establishing an interval ensures that other hosts in the cluster do not cause corruption by inappropriately interfering with the write operation between the initiating host and the target device. For example, in an asymmetric configuration the initiating host may obtain a lease from a controlling host in the cluster. A lease is an interval corresponding to an amount of time for which the initiating host may access the target device. The cluster maintains awareness that, for the duration of the lease, the initiating host may be accessing the target device. As a result, this approach allows the initiating host to initiate accesses to the target device for the duration of the lease. Similarly, in an asymmetric cluster, a quorum interval is often used to define a period of time during which an initiating host may access a target device.

Another approach, known as a Dead Man Timer, typically involves special hardware. This hardware counts down an interval from an initial value. Periodic communication, e.g. by the initiating host, resets the countdown to the initial value. If the Dead Man Timer counts down to zero, the Dead Man Timer hardware stops operation of the initiating host in a drastic fashion.

Input/Output (I/O) fencing is the term for protecting (i.e. "fencing") a target disk from potentially corrupting accesses (i.e. "I/O"). For a multiphase I/O operation (e.g. a straight multiphase operation) on, for example, Small Computer System Interface (SCSI) target devices, a write operation from an initiating host has four phases: a write request (Phase 1), a ready to write response (Phase 2), sending the data (Phase 3), and completion response (Phase 4). A SCSI target device additionally supports a device reset request that provides a (passive) time-based barrier to I/O operations on a target disk. An asserted device reset request, among other things, causes the target device to discard any operations between the receipt of a Phase 1 request and sending a Phase 4 response. These operations which are discarded by the target disk result in an identifiable failure provided in response to a data send in Phase 3. In other words, the use of a SCSI device reset allows the target disk to terminate the current operation under these conditions. Note that a period of time prior to the sending of the Phase 4 response may exist such that an I/O in progress may complete prior to the processing of a device reset received in this period of time. As a result, this device reset may not cause the target device TD to discard the operation and so a Phase 4 response is sent.

Unfortunately, when an initiating host appears to the cluster to have failed, but is actually still able to communicate with the target device, it is possible to corrupt the target disk when using a SCSI device reset.

SCSI-3 Persistent Group Reservation (PGR) is a standard technique of I/O fencing supported by some devices that is used to minimize corruption of shared storage devices. In SCSI-3 PGR, a persistent reservation is placed on a shared storage device. This reservation grants access to a specified set of initiating hosts while at the same time denying access to other initiating hosts. Thus, SCSI-3 PGR is a mechanism embedded in a target disk that provides a complete I/O fence. However, SCSI-3 PGR is not uniformly implemented in storage devices, rendering a SCSI-3 PGR solution insufficient. Additionally, many implementations of SCSI-3 PGR are not correct or complete, rendering some existing storage device implementations unusable for SCSI-3 PGR-based I/O fencing.

Therefore, what is needed are methods and systems for providing flexible and reliable I/O fencing in a shared storage environment and correspondingly reliably preventing data corruption in shared storage devices.

SUMMARY OF THE INVENTION

Systems and methods are described for providing I/O fencing in a shared storage environment. An I/O fence in accordance with the present invention may be built (e.g. in software) upon a device reset operation (e.g. a SCSI device reset). In the shared storage environment, an initiating host establishes an interval during which the initiating host may perform I/O operations on a target device. This interval can be (and typically is) extended after a successful communication with other nodes. In a multiphase I/O operation, the initiating host initiates phase requests and the target device initiates phase responses.

When feasible, the time of each request is checked against the current state of the interval (e.g. viable or expired) prior to initiating that request. As a result, a device reset occurring while the interval is viable does not arbitrarily terminate a multiphase I/O operation, but may restart the operation. However, a device reset occurring after the interval has expired results in a delay or termination of the multiphase I/O operation. For example, a device reset terminates I/O in a first SCSI phase that has been received by the device. However, the device reset will not necessarily terminate I/O that has not had a first SCSI phase received by the device. As a result, multiphase I/O operations from initiating hosts that have lost contact with the shared storage environment are fenced from I/O according to the present invention and are therefore not allowed to corrupt target devices in the shared storage. Thus, an initiating host fences itself from initiating potentially corrupting accesses to a target device.

BRIEF DESCRIPTION OF THE DRAWINGS

Similar elements in Figures are labeled similarly.

DESCRIPTION OF THE PREFERRED EMBODIMENTS

Figure 1:
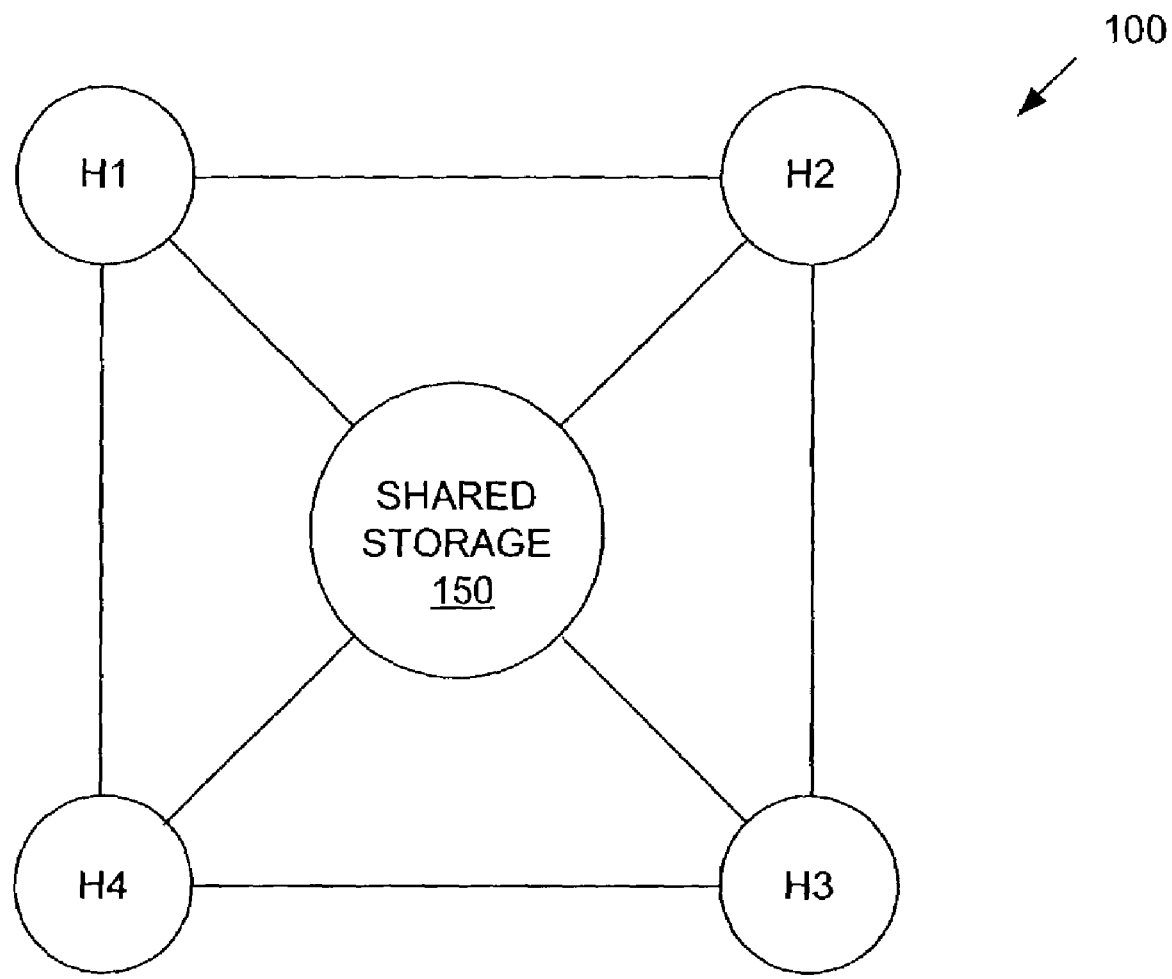
FIG. 1 is a block diagram of a shared storage environment in accordance with an embodiment of the present invention.

FIG. 1 is a block diagram of a shared storage environment 100 (e.g. a cluster) in accordance with an embodiment of the present invention. Host H2 is coupled to host H1 and to host H3. Host H4 is coupled to host H1 and host H3. Hosts H1-H4 are all coupled to shared storage 150.

In one embodiment of the present invention, shared storage environment 100 uses a straight multiphase style of I/O operations between hosts H1-H4 and target devices within shared storage 150. In a straight multiphase style of I/O operations, an initiating host sends requests to and receives responses from the target device. For example, a SCSI write operation proceeds in the four phases described above.

In another embodiment of the present invention, shared storage environment 100 uses a login-based multiphase style of I/O operations between hosts H1-H4 and target devices within shared storage 150. In a login-based multiphase style of I/O operations, an initiating host sends a login request to register a set of one or more I/O operations with the target device prior to initiating the multiphase operation. For example, a login request precedes the initiation of a set of one or more four phase SCSI write operations. The initiating host may continue I/O operations until logged out. While straight multiphase and login-based multiphase styles are described, it is understood that any multiphase style of I/O operation that is interrupted by some outside operation similarly benefits from application of the principles of the present invention.

Figure 2A:
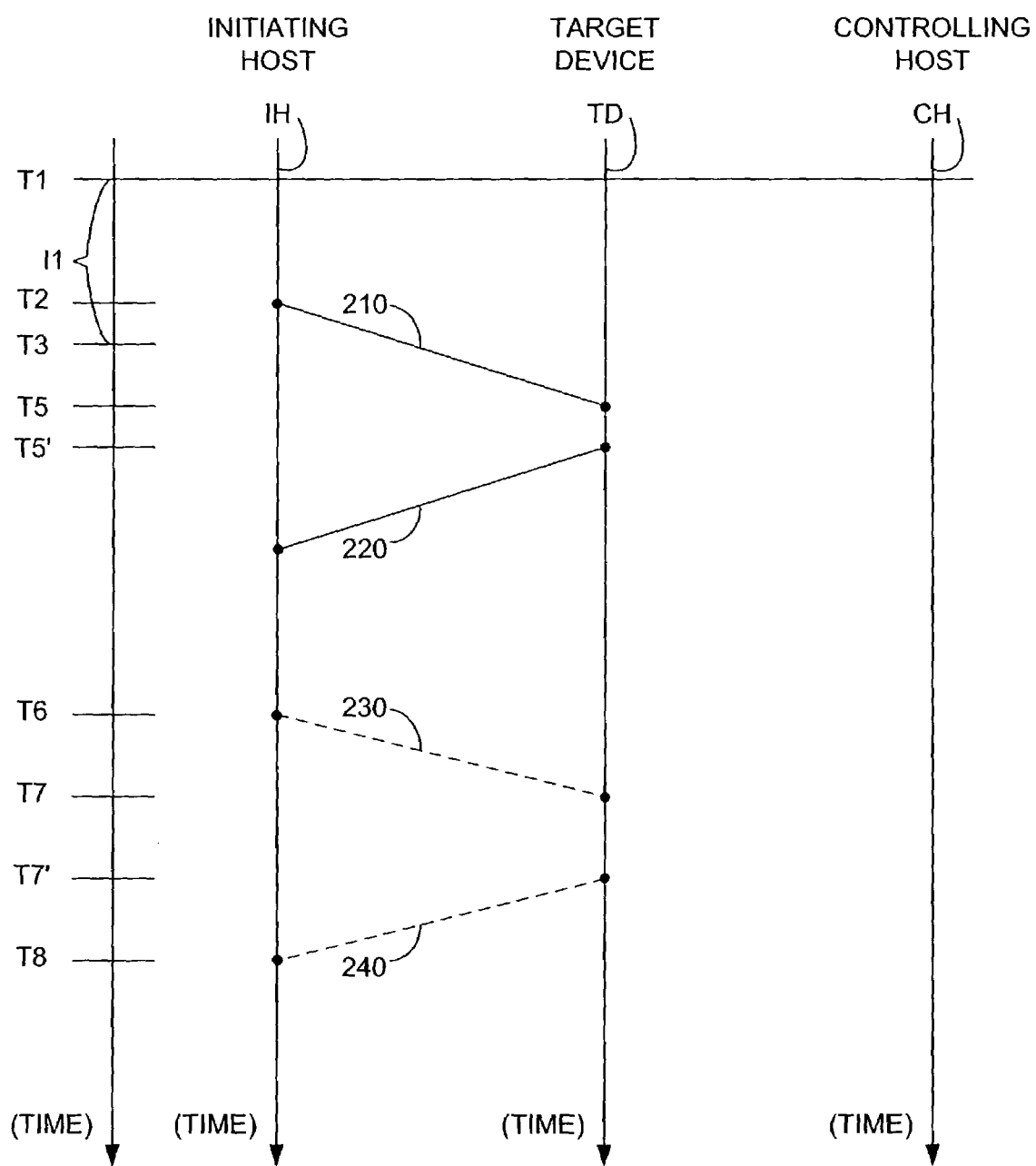
FIG. 2A is a timing diagram of a four phase multiphase operation in accordance with an embodiment of the present invention.

FIG. 2A is a timing diagram of a four phase multiphase operation in accordance with an embodiment of the present invention. In one embodiment, this multiphase operation occurs in a Fiber Channel Storage Array Network (SAN). In another embodiment, this multiphase operation occurs in a multi-host (also called multi-initiation), direct attached SCSI. An illustrative shared storage environment as shown in FIG. 2A includes the following components: an initiating host IH, a target device TD, and a controlling host CH. The operations of these components are showed along parallel axes of increasing time. The initiating host IH establishes an interval (e.g. obtains a lease) for access to target device TD from controlling host CH at time T1. Note that this interval can often be extended as a result of continued communication between the various hosts. This lease is represented by the period of time I1, ending at time T3. One or more hardware clocks may be used to reliably measure the period of time I1. A hardware clock is typically not affected by any non-deterministic activity. Thus, a shared storage environment (e.g. a cluster) is aware that initiating host IH is accessing target device TD between times T1 and T3. In one embodiment, the lease may be obtained in conjunction with a heartbeat signal.

At a time T2, initiating host IH checks the current time (time T2) from a local timer. Time T2 is compared to the time T3 at which the lease of duration I1 will end. Thus, time T3 is equal to the sum of time T1 and duration I1. Because the lease of initiating host IH on target device TD has not yet ended, i.e. T2<T3, initiating host IH sends a Phase 1 request 210 (e.g. a SCSI write request) to target device TD. At time T5, Phase 1 request 210 is received by target device TD, and at time T5' a Phase 2 response 220 (e.g. a SCSI ready to write response) is sent back to the initiating host IH. In other Figures, the receipt of a request and the initiation of a response may be shown as occurring simultaneously for clarity of discussion.

At a time T6, initiating host IH again obtains the current time (time T6) from a local timer. Time T6 is compared to the end of lease duration I1, time T3. Because the lease of initiating host IH on target device TD has expired, i.e. T3<T6, initiating host IH does not send the Phase 3 request (e.g. sending the write data in SCSI Phase 3) in response to the receipt of response 220. In some embodiments, initiating host IH holds request 230 until request 230 is marked to be discarded. In some embodiments, initiating host IH may continue to regularly check the current time against the expiration of the most recent lease. In these embodiments, the initiating host holds request 230 until the lease expiration is greater than the current time, indicating that a new lease to access target device TD has been acquired from the cluster. Thus, initiating host IH sends request 230 after the acquisition of the new lease which, in response, target device TD acknowledges with a Phase 4 response 240 (e.g. a SCSI completion response).

Figure 2B:
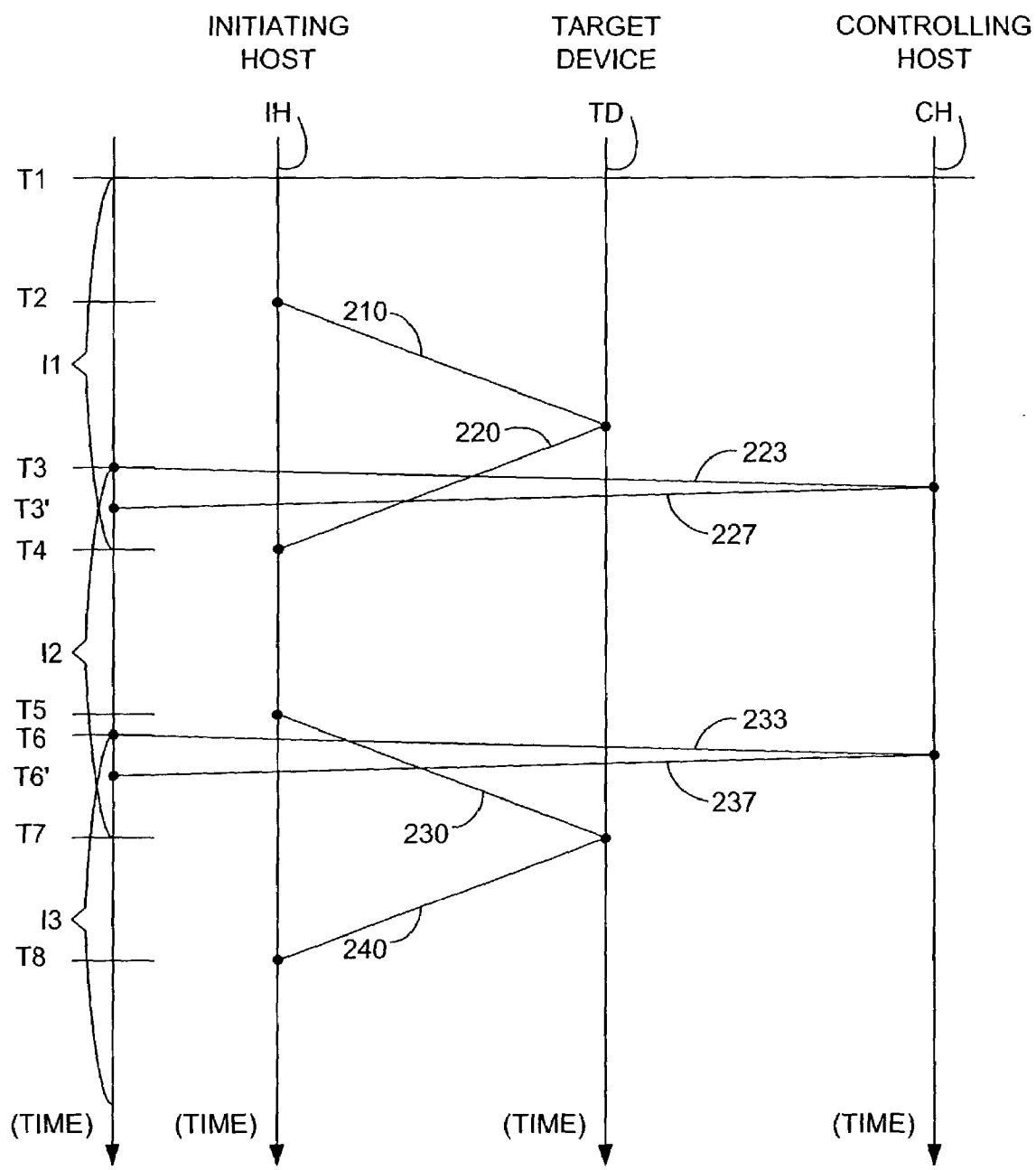
FIG. 2B is a timing diagram of a four phase multiphase operation in accordance with an embodiment of the present invention.

FIG. 2B is a timing diagram of a four phase multiphase operation in accordance with an embodiment of the present invention. FIG. 2B depicts a series of renewed intervals during the multiphase operation, which does not trigger the need for an I/O fence. Similar to the description with respect to FIG. 2A, initiating host IH establishes an interval (e.g. obtains a lease) of duration I1 for access to target device TD at time T1. At a time T2, initiating host IH obtains the current time (time T2) and compares time T2 with the lease end time T4. Because the lease of initiating host IH on target device TD has not yet expired, initiating host IH sends phase request 210 to target device TD. The receipt of request 210 and initiation of response 220 by target device TD are shown as occurring simultaneously for clarity of discussion. In other embodiments, e.g. FIG. 2A, the receipt of request 210 and the initiation of response 220, or any initiation in response to a receipt, may occur at different times.

At time T3, initiating host IH obtains interval renewal information. In one embodiment, this interval renewal is accomplished with a heartbeat signal from controlling host CH. For example, at time T3, initiating host IH sends a message 223 to controlling host CH, where message 223 references time T3. Controlling host CH responds to message 223 with response 227, received by initiating host IH at time T3'. The acknowledgement of message 223 by controlling host CH indicates that, as of time T3, initiating host is still in communication with the shared storage environment, and as such is still in a position to access target device TD. In response, initiating host IH renews interval I1 for a further period of time as measured from message 223 time T3, represented by interval I2. As a result, the interval for access to target device TD does not expire at time T4. In one embodiment, interval I2 is of the same duration as interval I1. At time T4, initiating host IH receives response 220 from target device TD.

At time T5, initiating host IH again obtains the current time (time T5) from a local timer. Time T5 is compared to the end of current lease duration I2, time T7. Because the lease of initiating host IH on target device TD has not yet expired, i.e. T5<T7, initiating host IH sends the phase 3 request 230 (e.g. sending the write data in SCSI phase 3) in response to the receipt of response 220. At time T6, initiating host IH again obtains interval renewal information. As described above, a message 233 referencing time T6 is acknowledged in response 237 at time T6'. In response, initiating host IH renews interval I2 for a further period of time as measured from message 233 time T6, represented by interval I3. As a result, the interval for access to target device TD does not expire at time T7. At time T8, initiating host IH receives response 240 from target device TD.

Figure 3:
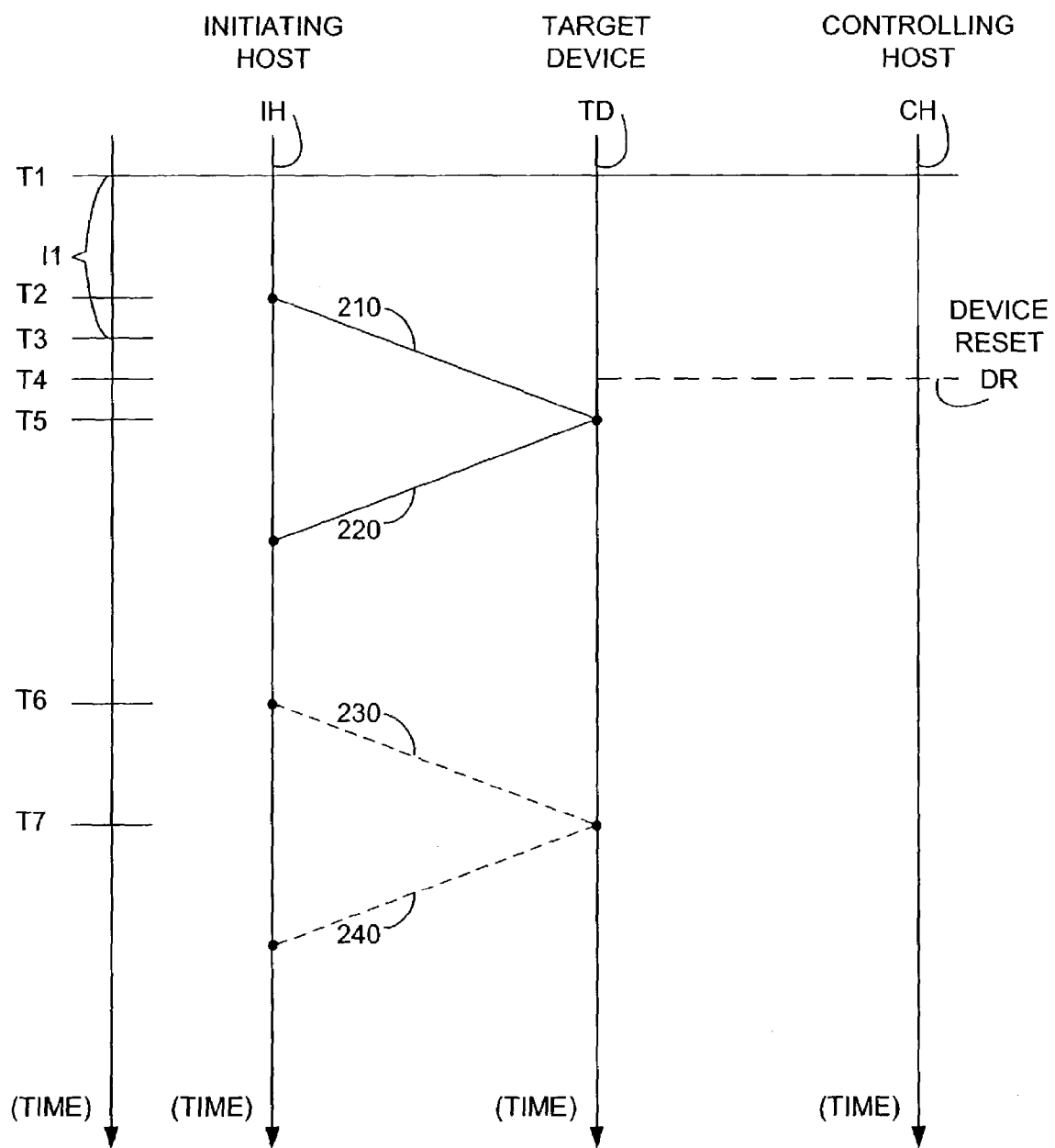
FIG. 3 is a timing diagram of another four phase multiphase operation in accordance with an embodiment of the present invention.

FIG. 3 is a timing diagram of a four phase multiphase operation in accordance with an embodiment of the present invention. FIG. 3 depicts the creation of an I/O fence according to the present invention by an initiating host IH utilizing a device reset. As described with respect to FIG. 2A, initiating host IH establishes an interval (e.g. obtains a lease) of duration I1 for access to target device TD at time T1. At a time T2, initiating host IH obtains the current time (time T2) and compares time T2 with the lease end time T3. Because the lease of initiating host IH on target device TD has not yet expired, initiating host IH sends Phase 1 request 210 to target device TD.

Between the initiation of request 210 at time T2 and the receipt of request 210 at time T5, controlling host CH prepares to recover target device TD (at time T4) by first initiating a device reset DR (e.g. a SCSI device reset). In a recovery operation, the surviving nodes (e.g. controlling host CH) in a shared storage environment attempt to either complete or back out operations applied to the target device TD. A recovery operation takes place after an I/O fence is complete. As shown in FIG. 3, the time T4 of device reset DR occurs later than the expiration of the lease at time T3. Because the lease has expired, the cluster is no longer expecting initiating host IH to access target device TD. Additionally, it is possible that initiating host IH has lost communication with the cluster (e.g. lost communication with controlling host CH). Under these conditions, corruption of target device TD may occur if another host accesses target device TD before initiating host IH completes or aborts the outstanding multiphase operation on target device TD.

As described above, at time T5, a Phase 1 request 210 is received by target device TD and a Phase 2 response 220 is sent back to the initiating host IH. Note that, because device reset DR is received prior to time T5, target device TD accepts Phase 1 request 210. However, because initiating host IH, according to the present invention, again checks the current time against the expiration of the lease (time T3) prior to initiating request 230, request 230 may be delayed or discarded. Thus, initiating host IH utilizes the device reset and the established interval (e.g. the lease) in the creation of an I/O fence. As a result, initiating host IH has "fenced" itself off from target device TD with respect to an I/O access (e.g. a SCSI write operation) to target device TD that may cause corruption.

Note that a device reset occurring prior to time T2 (initiation of request 210) or after time T7 (initiation of response 240) typically does not cause target device TD corruption because the operation (I/O access) has either not begun or is completed. Additionally, a device reset occurring between time T5 (receipt of request 210) and time T6 (initiation of response 240) typically does not cause target device TD corruption because target device TD is passively insulated from any operations between receipt of a Phase 1 request and sending of a Phase 4 response by the device reset.

However, conventionally, the passive time barrier applied by a device reset occurring between time T2 (initiation of request 210) and time T5 (receipt of request 210) does not protect target device TD. Conventionally, the initiating host IH does not check the time once the multiphase operation is initiated at time T2.

Additionally, from the perspective of the target device TD, the multiphase operation is not between receipt of a Phase 1 request and sending of a Phase 4 response prior to the receipt of the device reset DR from the recovery operation. Under these conditions, the conventional approach allows the possibility of corruption of target device TD by allowing the multiphase operation to continue. In contrast, an I/O fencing mechanism according to the present invention beneficially provides I/O fencing of target device TD under similar conditions. As a result, a failover operation may successfully recover the shared storage device (i.e. target device TD) for use by other hosts in the shared storage environment without fear of corruption when the initiating host has lost communication with the shared storage environment.

Figure 4:
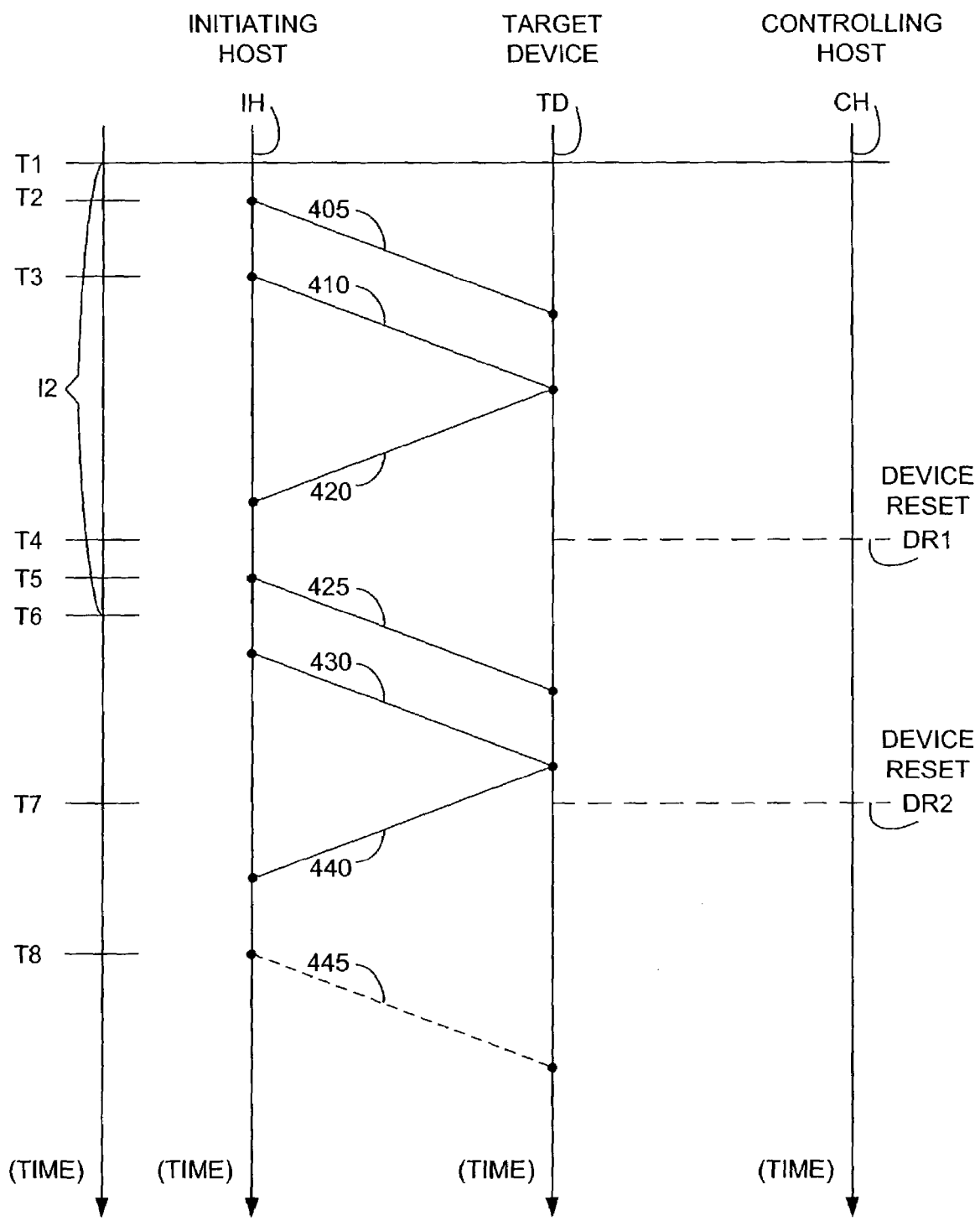
FIG. 4 is a timing diagram of a login-based, four phase multiphase operation in accordance with an embodiment of the present invention.

FIG. 4 is a timing diagram of a login-based, four phase multiphase operation in accordance with an embodiment of the present invention. In one embodiment, this multiphase operation occurs in a Fiber Channel SAN. In another embodiment, this multiphase operation occurs in an I-SCSI SAN (or other protocol derived from network login-based SCSI.

An initiating host IH establishes an interval (e.g. obtains a lease) for access to a target device TD from a controlling host CH at time T1. This lease is represented by the period of time I2 and ends at time T6 (time T1 plus duration of time I2). At time T2, initiating host IH sends a login request 405 to target device TD. Login request 405 registers the I/O operations of initiating host IH with target device TD. Once logged in, initiating host IH may perform I/O operations until the login is terminated. At time T3, initiating host IH obtains the current time (time T3) from a local timer. If time T3 is earlier than end of lease time T6, then initiating host IH sends a Phase 1 request 410 to target device TD. Target device TD responds with a Phase 2 response 420, similar to the operations described above. At time T4, controlling host CH issues a device reset DR1. Device reset DR1 functions to reset (i.e. log out) all connections registered with target device TD.

As noted above, a device reset may be issued for many reasons. Some of those reasons include preparing for a target device recovery from a failed initiating host. However, device resets may be issued for other reasons. As a result, a device reset alone is not sufficient reason to terminate an in-progress I/O operation. For example, a device reset issued prior to the expiration of a lease is unlikely to be due to a failure of communication between an initiating host and the cluster.

Conventionally, once registered on a target device, an initiating host will issue re-login requests automatically when the existing login terminated and an I/O operation is unfinished. In the present invention, initiating host IH obtains the current time (time T5) and compares that time to end of lease time T6. Because the lease has not yet expired, initiating host IH issues a re-login request 425 to target device TD, re-registering the I/O operation. Therefore, initiating host IH issues a Phase 3 request 430, and in response receives a Phase 4 response 440.

At time T7, controlling host CH issues another device reset DR2. Because device reset DR2 occurs after the expiration of the current lease, it is possible that initiating host IH has lost communication with the cluster. Thus, according to the present invention, the current time is obtained (time T8) and compared to the end of lease time T6. Because time T8 is later than end of lease time T6, initiating host IH does not automatically re-login (e.g. with re-login request 445) to re-register the I/O operation with target device TD. In this way, target device TD is "fenced" according to the present invention from an I/O operation that may result in corruption.

Similar to straight multiphase operations (described above), login-based multiphase operations conventionally do not check the time once the initial login request is made to target device TD. Therefore, conventionally, an initiating host IH will continue to re-login and re-register the I/O operation with the target device TD despite the occurrence of a recovery operation (e.g. a device reset DR). Under these conditions, the conventional approach allows the possibility of corruption of target device TD by allowing the multiphase operation to continue. In contrast, an I/O fencing mechanism according to the present invention beneficially provides I/O fencing of target device TD under similar conditions.

Figure 5:
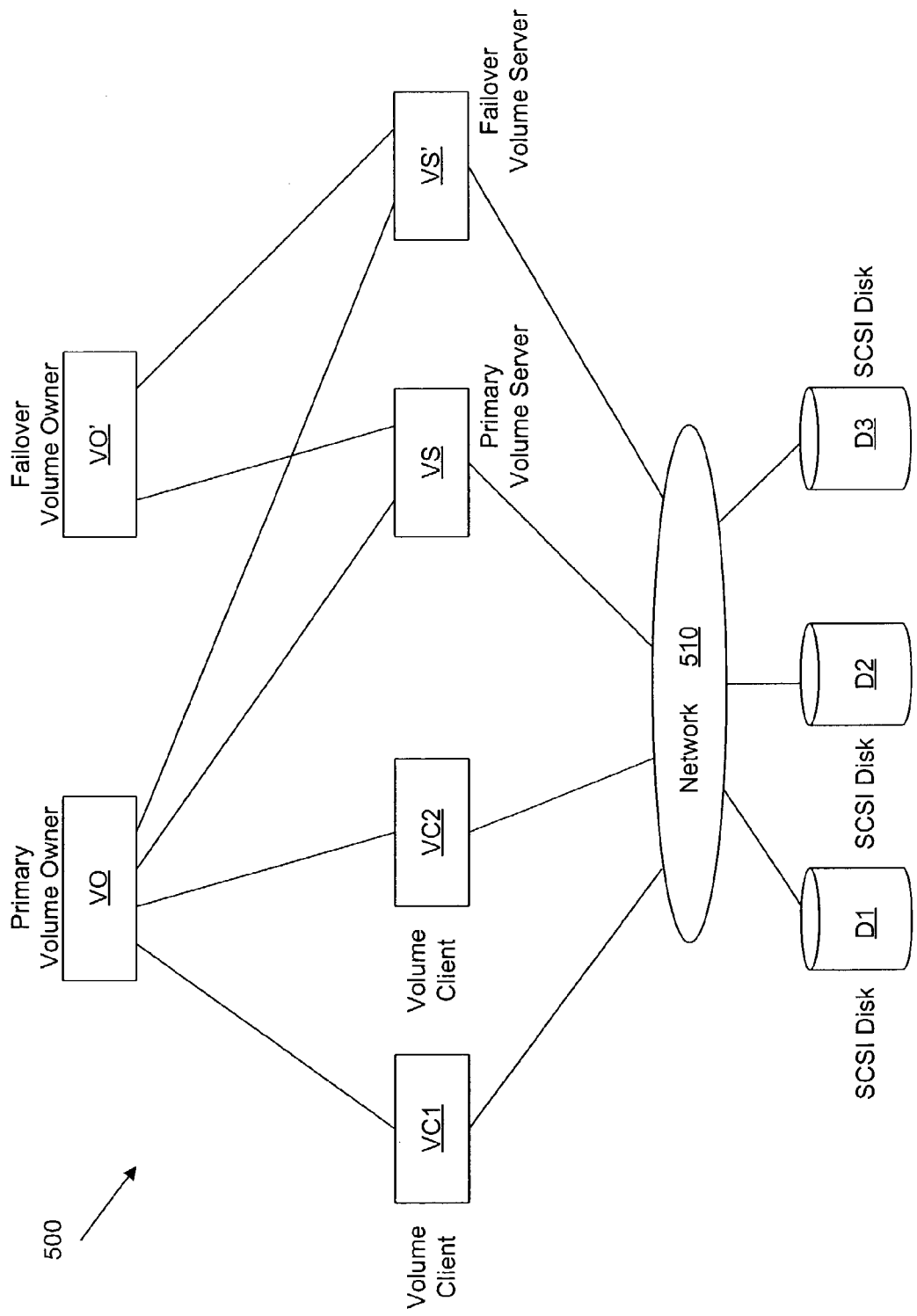
FIG. 5 is a block diagram of a SAN environment including SCSI disks in accordance with one embodiment of the present invention.

FIG. 5 is a block diagram of a SAN environment including SCSI disks in accordance with one embodiment of the present invention. SAN environment 500 includes a primary volume owner VO and a failover volume owner VO'. The primary volume owner VO controls and coordinates the I/O to an individual logical volume (not shown), the configuration of which is taken from a volume server. The secondary volume owner VO' takes over if the primary volume owner VO fails. A logical volume is a virtual representation of a unit of storage that maps to one or more physical disks or portions of physical disks.

SAN environment 500 further includes a primary volume server VS and a failover volume server VS', each coupled to both primary volume owner VO and failover volume owner VO'. The primary volume server VS brings up disk groups and controls the configuration of the logical volumes. The failover volume server takes over if the primary volume server fails.

SAN environment 500 additionally includes volume clients VC1 and VC2, network 510, and SCSI disks D1, D2, and D3. Volume clients VC1 and VC2 are each coupled to primary volume owner VO. Volume clients VC1 and VC2 are granted permission to do I/O to a volume or a portion of a volume by primary volume owner VO, and perform that I/O on behalf of applications. SCSI Disks D1, D2, and D3 are connected through network 510 to volume clients VC1 and VC2, primary volume server VS, and failover volume server VS', and respond to conventional SCSI multiphase operations. Operations to logical volumes are mapped to one or more of SCSI disks D1, D2, and D3.

In the example of the present embodiment, volume client VC1 receives permission from primary volume owner VO to access a logical volume mapping to a portion of SCSI disk D1. If volume client VC1 loses communication with primary volume owner VO temporarily, primary volume owner VO must be sure that volume client VC1 will no longer initiate requests to target SCSI disk D1. Volume client VC1 stores the time of each message sent to primary volume owner VO. When the message is acknowledged by primary volume owner VO, volume client VC1 is determined to have a lease of a particular duration (e.g. N seconds) from the time that volume client VC1 initiated the acknowledged message. Thus, volume client VC1 has a lease for requesting multiphase operations of SCSI disk D1 for a duration N seconds from that message send time.

Volume client VC1 then initiates requests (e.g. a SCSI Phase 1 write request) to SCSI disk D1. After SCSI disk D1 responds with a Phase 2 response (i.e. ready to write), volume client VC1 again checks the current time against the lease. If the lease has expired, then volume client VC1 aborts the transfer to SCSI disk D1. This prevents volume client VC1 from initiating a data transfer more than N seconds after it last communicated with primary volume owner VO. As a result, volume client VC1 fences SCSI disk D1 by preventing multiphase operations from continuing after the expiration of the lease.

Volume client VC1 may have initiated a SCSI write operation before expiration of the lease, and due to circumstances such as a slow connection or a large data transfer, the write may still be in progress when the lease expires. Under these conditions, the primary volume owner VO issues a SCSI device reset to SCSI disk D1. This device reset causes writes in progress to SCSI disk D1 to abort.

When primary volume owner VO determines that volume client VC1 has failed, primary volume owner VO waits N seconds (the lease duration) to make sure that all leases held by volume client VC1 have expired. After N seconds, primary volume owner VO issues a SCSI device reset to SCSI disk D1 to abort in progress I/Os. Afterwards, primary volume owner VO may initiate a recovery operation to clean up I/Os of volume client VC1 that were terminated in progress. After the recovery operation, primary volume owner VO is free to offer other volume clients (e.g. volume client VC2) full access to the logical volume (i.e., that is mapped to SCSI disk D1). Note that the volume client VC1 measures the lease from the sending of the last message that was acknowledged by primary volume owner VO to the time SCSI disk D1 responds to a multiphase request with a multiphase response.

In the foregoing detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

CONCLUSION

In the various embodiments of this invention, systems and methods have been described for providing I/O fencing in a shared storage environment. When feasible, the time of each request is compared to the current state of an interval (e.g. viable or expired) prior to initiating that request. As a result, a device reset occurring while the interval is viable does not arbitrarily end a multiphase I/O operation. However, a device reset occurring once the interval has expired results in a delay or termination of the multiphase I/O operation. As a result, multiphase I/O operations from initiating hosts that have lost contact with the shared storage environment are not allowed to corrupt the shared storage devices.

The various embodiments of the systems and methods of this invention that are described above are illustrative only of the principles of this invention and are not intended to limit the scope of the invention to the particular embodiments described. For example, in view of this disclosure, those skilled in the art can define other multiphase operations, shared storage environments, initiating hosts, and so forth, and use these alternative features to create a method or system according to the principles of this invention. Thus, the invention is limited only by the following claims.

What is claimed is:

1. A method of Input/Output (I/O) fencing comprising:
    establishing an end time of a time interval after which access is not allowed to a target device by a requesting device;
    initiating a multiphase write operation to the target device, wherein the multiphase write operation includes a first phase wherein the requesting device sends a write request to the target device, a second phase wherein the target device sends a response to the requesting device indicating that the target device is ready to write, a third phase wherein the requesting device sends data to the target device, and a fourth phase wherein the target device sends a response to the requesting device indicating that the data was written, wherein initiating the multiphase write operation comprises the requesting device initiating the first phase of the multiphase write operation;
    obtaining a time value prior to the requesting device initiating the third phase of the multiphase write operation; and
    interfering with the third phase of the multiphase write operation in response to determining that the time value is greater than the end time.

2. The method of claim 1, wherein the interfering with the third phase of the multiphase write operation prevents the third phase of the multiphase write operation from being performed.

3. The method of claim 1, wherein the interfering with the third phase of the multiphase write operation delays the third phase of the multiphase write operation.

4. The method of claim 1, wherein the multiphase write operation is a SCSI four phase write operation.

5. The method of claim 1, wherein the multiphase write operation is a straight multiphase write operation.

6. The method of claim 1, wherein the multiphase write operation is a login-based multiphase write operation.

7. The method of claim 1, wherein the time interval is a quorum time interval.

8. The method of claim 1, wherein the time interval is a lease.

9. The method of claim 1, wherein the target device is a SCSI disk.

10. The method of claim 1, wherein the target device is a physical disk, and wherein a logical volume is mapped to at least a portion of the physical disk.

11. The method of claim 1, further comprising:
    performing a login operation for logging in to the target device in order to enable the requesting device to communicate with the target device to perform the multiphase write operation; and
    preventing a re-login operation for re-logging in to the target device from occurring in response to determining that the time value is greater than the end time, wherein preventing the re-login operation interferes with the third phase of the multiphase write operation.

12. The method of claim 1, wherein interfering with the third phase of the multiphase write operation is performed by the requesting device.

13. The method of claim 1, wherein interfering with the third phase of the multiphase write operation is performed by a volume client.

14. The method of claim 1, further comprising receiving a device reset.

15. The method of claim 14, further comprising initiating a recovery operation on the target device after receiving the device reset.

16. The method of claim 15, wherein the recovery operation is initiated by a volume owner.

17. The method of claim 15, wherein the recovery operation is initiated by a controlling host.

18. The method of claim 15, wherein the recovery operation is initiated by a host within a quorum of a symmetric cluster.

19. The method of claim 15, wherein the recovery operation is initiated by a host remaining in a cluster.

20. The method of claim 1, wherein the end time and the time value are determined by a hardware clock.

21. An Input/Output (I/O) fencing system comprising:
    a reliable clock for establishing an end time of a time interval after which access is not allowed to a target device by a requesting device;
    means for initiating a multiphase write operation to the target device, wherein the multiphase write operation includes a first phase wherein the requesting device sends a write request to the target device, a second phase wherein the target device sends a response to the requesting device indicating that the target device is ready to write, a third phase wherein the requesting device sends data to the target device, and a fourth phase wherein the target device sends a response to the requesting device indicating that the data was written, wherein initiating the multiphase write operation comprises initiating the first phase of the multiphase write operation;
    means for obtaining a time value prior to initiating the third phase of the multiphase write operation; and means for interfering with the third phase of the multiphase write operation in response to determining that the time value is greater than the end time.

22. The system of claim 21, wherein the interfering with the third phase of the multiphase write operation prevents the third phase of the multiphase write operation from being performed.

23. The system of claim 21, wherein the interfering with the third phase of the multiphase write operation delays the third phase of the multiphase write operation.

24. The system of claim 21, wherein the multiphase write operation is a SCSI four phase write operation.

25. The system of claim 21, wherein the multiphase write operation is a straight multiphase write operation.

26. The system of claim 21, wherein the multiphase write operation is a login-based multiphase write operation.

27. The system of claim 21, wherein the time interval is a quorum time interval.

28. The system of claim 21, wherein the time interval is a lease.

29. A method of Input/Output (I/O) fencing comprising:
  establishing an end time of a time interval after which access is not allowed to a target device by a requesting device;
  performing a login operation to enable initiation of a multiphase write operation to the target device, wherein the multiphase write operation includes a first phase wherein the requesting device sends a write request to the target device, a second phase wherein the target device sends a response to the requesting device indicating that the target device is ready to write, a third phase wherein the requesting device sends data to the target device, and a fourth phase wherein the target device sends a response to the requesting device indicating that the data was written;
  initiating the multiphase write operation to the target device, wherein initiating the multiphase write operation comprises initiating the first phase of the multiphase write operation;
  obtaining a time value after initiating the first phase of the multiphase write operation;
  performing a re-login operation in response to determining that the time value is less than the end time; and
  initiating the third phase of the multiphase write operation after performing the re-login operation.

30. The method of claim 29, wherein performing the re-login operation occurs after one of a disconnect and a reset.

31. The method of claim 29, wherein the multiphase write operation is a SCSI four phase write operation.

32. The method of claim 29, wherein the time interval is a quorum time interval.

33. The method of claim 29, wherein the time interval is a lease.

34. An Input/Output (I/O) fencing system comprising:
  a reliable clock for establishing an end time of a time interval after which access is not allowed to a target device by a requesting device;
  means for performing a login operation to enable initiation of a multiphase write operation to the target device, wherein the multiphase write operation includes a first phase wherein the requesting device sends a write request to the target device, a second phase wherein the target device sends a response to the requesting device indicating that the target device is ready to write, a third phase wherein the requesting device sends data to the target device, and a fourth phase wherein the target device sends a response to the requesting device indicating that the data was written;
  means for initiating the multiphase write operation to the target device, wherein initiating the multiphase write operation comprises initiating the first phase of the multiphase write operation;
  means for obtaining a time value after initiating the first phase of the multiphase write operation;
  means for performing a re-login operation in response to determining that the time value is less than the end time; and
  means for initiating the third phase of the multiphase write operation after performing the re-login operation.

35. The system of claim 34, wherein the re-login operation is performed after one of a disconnect and a reset occurs.

36. The system of claim 34, wherein the multiphase write operation is a SCSI four phase write operation.

37. The system of claim 34, wherein the time interval is a quorum time interval.

38. The system of claim 34, wherein the time interval is a lease.

* * * * *